Figure 1:
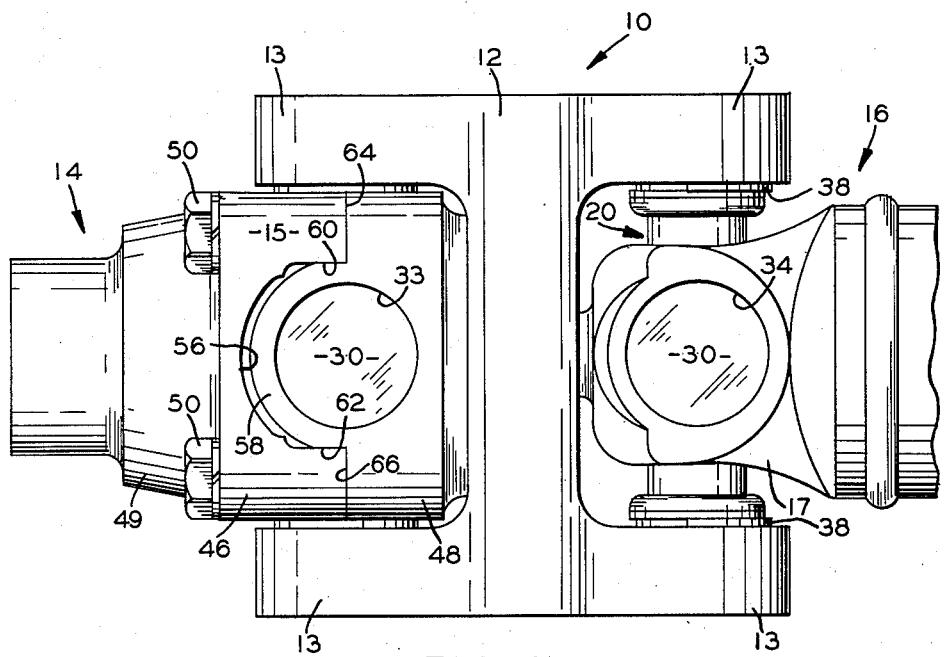

Dec. 1, 1964 P. J. MAZZIOTTI 3,159,013
DOUBLE CARDAN YOKE ASSEMBLY
Filed Dec. 1, 1961 2 Sheets-Sheet 1

Dec. 1, 1964     P. J. MAZZIOTTI     3,159,013
DOUBLE CARDAN YOKE ASSEMBLY
Filed Dec. 1, 1961     2 Sheets-Sheet 2
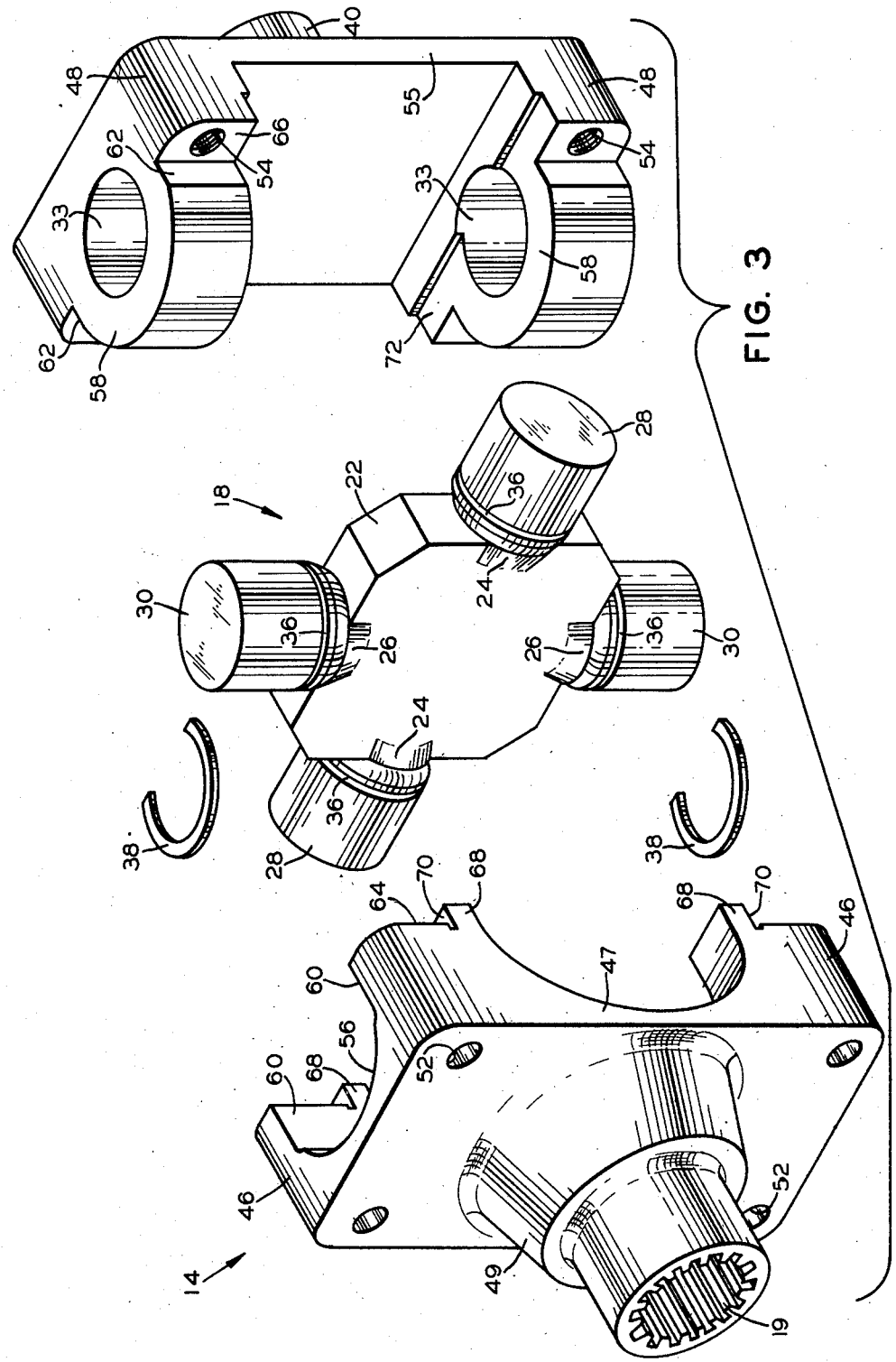

United States Patent Office 3,159,013
Patented Dec. 1, 1964

3,159,013
DOUBLE CARDAN YOKE ASSEMBLY
Philip J. Mazziotti, Toledo, Ohio, assignor to Dana Corporation, Toledo, Ohio, a corporation of Virginia
Filed Dec. 1, 1961, Ser. No. 156,355
3 Claims. (Cl. 64—17)

This invention relates to universal joints in general and more particularly to the structure of a yoke member for use in conjunction with a double Cardan universal joint.

The construction of a double Cardan joint, having the usual H-shaped intermediate connecting member, requires a pair of yoke members having pilot means thereon extending inwardly into the H-shaped member. These inwardly extending pilot means are in pivotal engagement within the H-shaped member and act as a centering device to insure that the axes of the yoke members are in proper intersecting relationship whereby the double Cardan joint transmits torque at a constant rotational velocity.

In the usual construction, each yoke has a pair of lugs which engage bearing races pivotally disposed on opposed trunnions of a journal cross, while the H-shaped member engages bearing races pivotally disposed on opposed trunnions of the journal cross displaced 90° from the above trunnions. The inwardly extending pilot means of the yoke are normally integral with or fixedly secured to the lug portion of the yokes.

An example of the integral construction of the lug and pilot means is shown in Patent No. 2,988,904; and although the composite structure functions satisfactorily, the integral nature of the yoke and pilot means leads to difficulties in the assembly of the joint.

An example of a fixedly secured construction is shown in Patent No. 2,953,910. In this construction the lugs of the yoke member are split transversely through the center of the opening in the lug which receives the trunnion's bearing race so that the pilot means is carried by half of the lug and the yoke body carries the remaining portion of the lug. The two lug portions are adapted to receive the usual bearing race which is disposed on the journal trunnion and the lug portions are fixedly interconnected by a plurality of bolts. Although this construction allows the double Cardan joint to be easily assembled, the two lug portions are acting as clamping members directly on the bearing race and apply a compressive force thereto. This clamping is difficult to control, due to manufacturing tolerances, and excessive force may cause early failure of the assembly while insufficient force will permit the joint to loosen.

Another example of a fixedly secured construction is shown in Patent No. 3,001,386 wherein the lugs of the yoke member are split transversely at a point removed from the bearing race receiving opening. The two lug portions are formed with a key and slot driving arrangement at the transverse split and fixedly interconnected by a plurality of bolts. This construction avoids the clamping problem present in the structure shown in Patent No. 2,953,910 since the bearing race is pressed into the opening contained in one of the lug portions; however, further difficulties are encountered because the key and groove construction drivingly connecting the two lug portions lies at a point removed from the bearing race receiving opening. As a result, torque transfer between the two lug portions is at a point displaced from the trunnion centerline and imposes a bending movement between the lug portions at the key and slot driving location subjecting the connecting bolts to bending loads and requiring the latter to transmit a portion of the torque.

This is a highly unsatisfactory arrangement and leads to early failure of the connecting bolts. Further, since the bolts must perform part of the driving function in addition to holding the yokes together, loss or failure of a bolt results in loss of the driving connection.

Another disadvantage of the structure shown in patent 3,001,386 is that the qualifying locations for insuring lug lateral alignment must be formed by a separate machining operation since they are located on the outer surface of the lugs; a surface which normally may be left in the rough condition. Since the inner surface of the lug must normally be processed for clearance purposes and for dimensional purposes to properly locate an internal snap ring, by placing the qualifying location for insuring lug lateral alignment on the inner surface of the lug, the machining operations for alignment and snap ring location may be accomplished simultaneously.

It is, therefore, an object of this invention to provide a yoke assembly for use in a double Cardan universal joint having pilot means adapted to extend inwardly into the H-shaped member.

It is another object of this invention to provide such a yoke assembly wherein the inwardly extending pilot means is fixedly secured to the yoke lug.

Yet another object of this invention is to provide such a yoke assembly wherein the connection between the pilot means and the remainder of the yoke approaches the transverse centerline of the journal trunnion received thereby.

Yet a further object of this invention is to provide a yoke assembly with a two part lug wherein the driving connection between the lug portions approaches the transverse centerline of the journal trunnion received thereby.

It is still another object of this invention to provide a yoke having lugs consisting of two portions, one portion being integral with the yoke and the other portion being an extension thereof. One of the portions of the lug is adapted to wholly receive a bearing race assembly and the other portion of the lug is adapted to drivingly engage the one portion of the lug inwardly from the end thereof at a location approaching the bearing race transverse centerline.

It is a still further object of this invention to provide such a yoke having a lug consisting of two portions wherein the qualifying portion for assuring lug lateral alignment is located on the inside surface of at least one of the lugs.

Still another object of this invention is to provide such a yoke adapted to utilize bearing retaining snap rings disposed inwardly of the lugs and to dispose the snap ring engaging surface and the lateral qualifying surface whereby they may be machined simultaneously.

Figure 2:
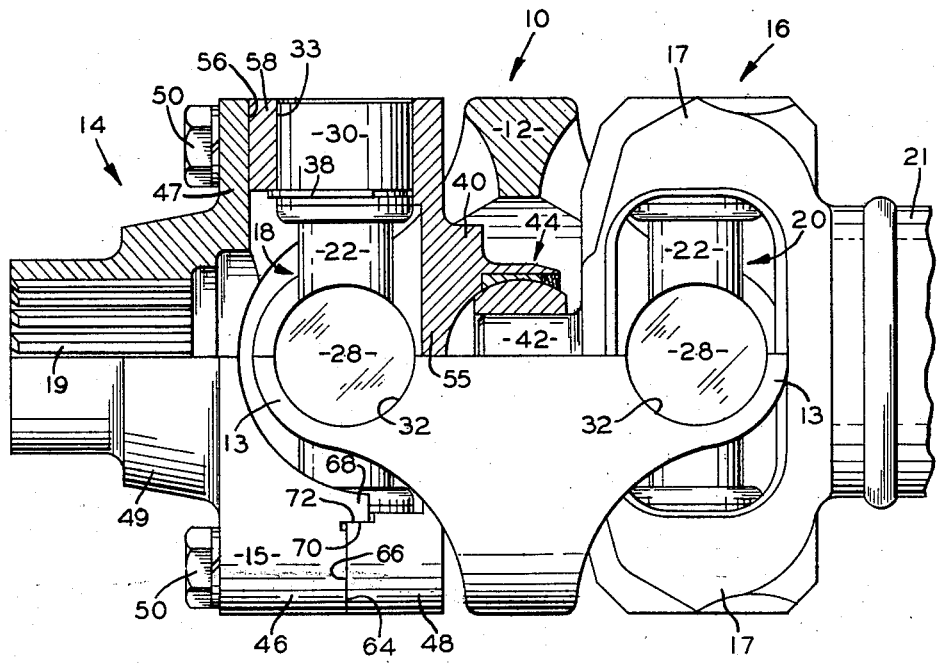

Further and other objects of this invention will become apparent upon a consideration of the following specification and drawings wherein:

FIG. 1 is a longitudinal elevational view of a double Cardan universal joint incorporating this invention, FIG. 2 is a view of the joint of FIG. 1 after being rotated 90° about its longitudinal axis and with portions cut away for added clarity, and FIG. 3 is an exploded perspective view of the yoke of this invention and its cooperating journal cross.

Referring now to the drawings, a double Cardan joint shown generally at 10 includes an H-shaped connecting member 12 having the usual four lugs 13 and a pair of yokes 14 and 16; the yokes being formed with a pair of opposed spaced lugs 15 and 17 respectively. The yoke 14 is internally splined as at 19 for engaging a cooperatively splined driving or driven member (not shown) while the yoke 16 is welded to a cylindrical drive or driven member 21; however, the means of attachment to the drive and driven member is a matter of choice and forms no part of this invention. Each yoke member receives the usual journal cross and bearing race assembly indicated generally by the numerals 18 and 20 respectively (FIG. 2). These assemblies include a journal cross 22 formed with two pairs of radially extending trunnions 24 and 26 thereon carried in opposed equally spaced circumferential displacement with each trunnion rotatably mounting a bearing race assembly 28 and 30 respectively.

The races 28 are securedly positioned in opposed openings 32 in the lugs 13 of the H-shaped member 12, while the bearing races 30 are securely positioned in opposed openings 33 provided in lugs 15 and openings 34 in lugs 17 of the yokes 14 and 16. Each race 28 and 30 is provided with a peripheral snap ring groove 36 (shown most clearly in FIG. 3) formed on the inward end thereof, which groove receives a cooperating snap ring 38. The snap rings 38, by engaging the snap ring grooves 36 and the inside surface of the respective lugs 15 and 17 of the yokes 14 and 16 and the lugs 13 of the H-shaped member 12 prevent the races 28 and 30 from moving outwardly and thereby position the journal cross and bearing race assemblies relative to the lugs. In this manner the yokes 14 and 16 are pivotally connected and centralized relative to the H-shaped member 12.

The yokes 14 and 16 are each provided with pilot means 40 and 42 respectively extending therefrom into the H-shaped member. The pilot means are pivotally connected as shown generally at 44 in a suitable manner (such as clearly described in Patent No. 2,988,904) and act as a centering device to insure that the axes of the yokes 14 and 16 are in proper intersecting relationship whereby the double Cardan joint 10 transmits torque at a constant rotational velocity.

The Cardan joint thus far described is conventional in nature, the invention being directed to the structure of the yoke 14 which will now be more fully described. As clearly shown in the drawings, the lug 15 of the yoke 14 is formed in two portions 46 and 48, with the portion 46 being formed integrally with the web 47 carried by the barrel 49 of the yoke 14 and the extension portion 48 being fixedly secured to the web portion by a plurality of bolts 50; the bolts 50 passing through the openings 52 in the lug portions 46 and threadedly engaging openings 54 in the lug portions 48. The lug portions 48 are interconnected by a web 55 from which extends the pilot member 40.

Each lug portion 46 has a receiving means in the form of a centrally disposed concave opening 56 which is adapted to accommodate a convex projection 58 formed centrally on each lug portion 48. The bearing race receiving openings 33 of the yoke 14 are formed in the extension portion 48 thereof and positioned so that the transverse centerline of the opening approximately coincides with the base of the projection 58 whereby the opening 33 is substantially equally disposed in the main portion of the lug extension 48 and the projection 58.

The extremities of opening 56 and the base of the projection 58 are formed with axially extending cooperating shoulders 60 and 62 respectively which shoulders are in abutting relationship and provide the driving connection and circumferential alignment between the lug portions 46 and 48. The openings 56 and the projection 58 received thereby are proportioned so that only the shoulders 60 and 62 are in engagement; the balance of the opening 56 being spaced from the projection 58. The outer end of the axial shoulders 60 and the base of the axial shoulders 62 terminate in transversely extending shoulders 64 and 66 respectively which shoulders are secured in abutting relationship by the bolts 50. It is apparent that irrespective of the extent to which the bolts 50 are tightened there will be no compressive load exerted upon the bearing races 30 disposed in the openings 33 since the bolt loads are entirely absorbed in the shoulders 64 and 66 while the opening 56 and projection 58, with the exception of the axial shoulder portions 60 and 62, are spaced from each other. Furthermore, since the shoulders 60 and 62 are engaged at a location which approximately coincides with the centerline of the openings 33 and additionally as a result of the interengagement of the two parts 46 and 48 of lug 15, the web portion 47 is in close proximity to the centerline. When torque is transferred between the yoke 14 and the journal cross 22, there is very little bending load between the lug portions 46 and 48, and as a consequence the bolts 50 are not subjected to detrimental bending loads nor must they transmit a portion of the torque load.

Means are provided to insure the lateral alignment of the lug portions 46 and 48. More particularly each lug portion 46 is formed with a pair of transversely spaced integral bosses 68 which extend axially from the radially inward portion of the transversely extending shoulder 64. The bosses 68 of each lug 46 are in paired opposed relationship with the bosses 68 on the opposite lug 46 and the radially outward surfaces 70 thereof are processed to a spaced-apart relationship of predetermined dimension and displacement from the axial center of the yoke 14. The inner surface 72 of each lug portion 48 and the projection 50 thereon are processed to a spaced-apart relationship of predetermined dimension and displacement from the axial center of the yoke 14 (determination of the above two displacement dimensions will be described hereinafter) and cooperates in an abutting relationship with the outer surface 70 of the bosses 68. The surface 72 extends axially inward from the end of the projection 58 for a sufficient distance so as not to interfere with the end of the bosses 68. This engagement between the surfaces 70 of the lug portions 46 and the surfaces 72 of the lug portions 48 laterally align the two lug portions.

Means are provided on the lug 15 of the yoke 14 to position the snap ring 38 disposed in the groove 36 of the race 30 so as to properly position the journal cross assembly 18 relative to the yoke 14. For this purpose, the surfaces 72 on the lugs 48, in addition to engaging the surfaces 70 on the lug portion 46, are processed to the aforementioned spaced-apart relationship of predetermined dimension and displacement from the axial center of the yoke whereby they abuttingly engage the snap ring 38 and position the same in proper spaced-apart relationship. The distance between the opposed surfaces 72 is primarily selected for this purpose and the distance between the surfaces 70 on the lugs 46 is processed accordingly to cooperate therewith. Thus, each surface 72 may be processed in a single uniplanar operation and serve to position the snap ring 38 and the surfaces 70 engaging the same.

From the foregoing it is apparent that a yoke adapted for use with double Cardan universal joints has been described wherein the inwardly extending pilot means is fixedly secured to the yoke; wherein the driving connection between the pilot means and the remainder of the yoke approaches the transverse centerline of the yoke; wherein the two part lug thereof is drivingly connected at a position which approaches the transverse centerline of the journal trunnion received thereby; which has lugs consisting of two portions, one portion being integral with the yoke and the other portion being an extension thereof, with one of the portions of the lug adapted to wholly receive a bearing race assembly and the other portion of the lug is adapted to drivingly engage the one portion of the lug inwardly from the end thereof at a location approaching the bearing race transverse centerline; which yoke has lugs consisting of two portions adapted to be interconnected in abutting relationship with the qualifying portion for insuring lug lateral alignment located on the inside surface of at least one of the lugs; which yoke is adapted to utilize bearing retaining snap rings disposed internally of the lugs and to dispose the snap ring engaging surfaces and lateral qualifying surfaces whereby they may be machined simultaneously.

The preferred embodiment of this invention has been shown and described, but changes and modifications can be made and it is understood that the foregoing description is illustrative only and not for the purpose of rendering this invention limited to the details illustrated or described except insofar as they have been limited by the terms of the following claims.

What is claimed is:

1. A yoke adapted for use in a double Cardan universal joint assembly comprising means adapted for attachment to a torque transferring member, a first web connected to said means and extending radially therefrom, a first and a second pair of lug portions, said first pair of lug portions being integral with and extending axially from said first web in radial spaced relationship and said second pair of lug portions being secured to and extending axially from said first pair of lug portions, a second web integral with and interconnecting said second lug portions and having pilot means extending axially therefrom, one pair of said lug portions each having an axial projection thereon extending toward the other pair of lug portions, said one pair of lug portions each defining a radially extending opening therein and each defining an inner engaging surface, said radially extending opening being located substantially equally divided between said projection and the remainder of said one lug portion whereby the base of said projection lies substantially on a line extending through the transverse axis of said opening, each of said other pair of lug portions having an axially extending concave opening therein receiving said projection and engaging the base thereof, the extremities of said concave opening and the base of said projection being drivingly engaged whereby torque is transferred between said portions at approximately the centerline of said openings, a cup-shaped bearing race having a closed end and an open end and having a peripheral snap ring groove adjacent the open end thereof and being disposed in each of said radial openings with the open end thereof facing radially inwardly and the snap ring groove positioned radially inwardly of said lug portion receiving the same, a journal cross having at least a pair of opposed trunnions with one trunnion being rotatably disposed in each of said bearing races, a snap ring positioned in each of said snap ring grooves and abuttingly and positioningly engaging the inner surface of said one pair of lug portions, the other of said pair of lug portions having laterally aligning abutment means thereon abuttingly and positioningly engaging said inner surface of said one pair of lug portions whereby said inner surface of said one pair of lug portions laterally aligns said portions and positions said bearing races.

2. A yoke adapted for use in a double Cardan universal joint assembly comprising, a barrel adapted for attachment to a torque transferring member, a web formed integrally with said barrel and extending radially therefrom, a first and a second pair of lug portions, said first pair of lug portions being integral with and extending axially from said first web in radial spaced relationship and said second pair of lug portions being secured to and extending axially from said first pair of lug portions, a second web integral with and interconnecting said second lug portions and having pilot means extending axially therefrom, said second pair of lug portions each having an axial projection thereon extending toward said first pair of lug portions, said second pair of lug portions each having a radially extending opening completely therethrough and each having an inner engaging surface, said radially extending openings being substantially equally divided axially between said projection and the remainder of said second lug portions whereby the base of said projection lies substantially on a line extending through the transverse axis of said openings, said first pair of lug portions having an axially extending concave opening therein receiving said projection, the extremities of said concave opening and the base of said projection being drivingly engaged with the remainder of said opening being spaced from the remainder of said projection whereby torque is transferred between said portions at approximately the centerline of said openings, a cup-shaped bearing race having a closed end and an open end and a peripheral snap ring groove adjacent the open end thereof and being disposed in each of said radial openings with the open end thereof facing radially inwardly and the snap ring groove positioned radially inwardly of said second lug portions, a journal cross having at least a pair of opposed trunnions with one trunnion being rotatably disposed in each of said bearing race, and a snap ring positioned in each of said snap ring grooves and abuttingly and positioningly engaging the inner surface of said second lug portions, said first pair of lug portions having laterally aligning abutment means thereon abuttingly and positioningly engaging said inner surface of said second pair of lug portions whereby said inner surface of said second pair of lug portions laterally aligns said portions and positions said bearing races.

3. A yoke according to claim 2 wherein said surface engaging said snap ring and said surface engaging said laterally aligning abutment means are in uniplanar relationship.

References Cited by the Examiner

UNITED STATES PATENTS

| 2,228,715 | 1/41 | Wollner. | |
| 2,947,158 | 8/60 | King | 64—21 |
| 2,978,886 | 4/61 | Marquis | 64—21 |
| 3,001,386 | 9/61 | King | 64—17 |

FOREIGN PATENTS 705,009    3/54    Great Britain.

ROBERT C. RIORDON, *Primary Examiner.*

KARL J. ALBRECHT, BROUGHTON G. DURHAM,
*Examiners.*